United States Patent [19]

Tajima et al.

[11] Patent Number: 4,888,700
[45] Date of Patent: Dec. 19, 1989

[54] APPARATUS FOR PROCESSING CONTENTS OF TOTALIZING MEMORIES IN ELECTRONIC BALANCE ASSEMBLY

[75] Inventors: Noriyasu Tajima; Suzuki Michio; Hidemi Mihara, all of Shizuoka, Japan

[73] Assignee: Tokyo Electric Co., Ltd., Tokyo, Japan

[21] Appl. No.: 275,657

[22] Filed: Nov. 22, 1988

Related U.S. Application Data

[63] Continuation of Ser. No. 943,730, Dec. 19, 1986, abandoned.

[30] Foreign Application Priority Data

Dec. 24, 1985 [JP] Japan ................. 60-291727

[51] Int. Cl.⁴ .............................................. G06F 15/20
[52] U.S. Cl. ........................... 364/466; 364/900; 364/918.5; 364/928
[58] Field of Search .................. 364/200, 900, 406; 177/4, 170

[56] References Cited

U.S. PATENT DOCUMENTS

| | | | |
|---|---|---|---|
| 4,159,521 | 6/1979 | Hall et al. | 364/466 |
| 4,229,794 | 10/1980 | Foster | 364/466 |
| 4,366,552 | 12/1982 | Uchimura et al. | 364/900 |
| 4,423,792 | 1/1984 | Cowan | 177/25 |
| 4,516,208 | 5/1985 | Sakura et al. | 364/466 |
| 4,525,799 | 6/1985 | Okawa et al. | 364/900 |
| 4,655,304 | 4/1987 | Tajima | 177/4 |
| 4,700,792 | 10/1987 | Tajima et al. | 177/178 |

FOREIGN PATENT DOCUMENTS

2642297  3/1977  Fed. Rep. of Germany .

*Primary Examiner*—Thomas M. Heckler
*Attorney, Agent, or Firm*—Oblon, Spivak, McClelland, Maier & Neustadt

[57] ABSTRACT

In the apparatus of the present invention for processing data contents of totalizing memories, item signs and arithmetic signs are preset in memory terms to be processed such as weight, price and so forth. The apparatus comprises an internal memory having a matrix-like memory processing table where processing numerical expressions are set by combination of items signs and arithmetic signs at predetermined addresses of the table constituted by the totalizing memories with designated addresses and the memory processing timing in respect of such memories; and an external input means for designating a desired address in the internal memory and changing and inputting the processing numerical expression of the matrix-like table thereto. Thus the contents of the totalizing memories can be altered and set easily by the numerical expressions which are changeable by such external input means, hence facilitating alteration of the contents to be totalized at the user level.

3 Claims, 8 Drawing Sheets

| AD | MEMORIES | JOBS | AD DIGITS | AD BYTES | 0 WEIGHING LABEL | 1 FIXED-AMOUNT LABEL | 2 PRECEDING DATA CORRECTION | 3 TOTAL CUSTOMERS | 4 CLERK-CLASSIFIED ADD'NL WEIGHING REGISTR. | 5 CLERK-CLASSIFIED ADD'NL FIXED AMT. REGISTR. | 6 SUBTOTAL DISCOUNT | 7 RETRO-ACTIVE CORRECTION PRECEDING DATA CORRECTION |
|---|---|---|---|---|---|---|---|---|---|---|---|---|
| 00 | PLU MEMORIES / MEMORIES 1 | NO. OF ITEMS | 6 | 3 | +1 | +1 | # | 0 | +1 | +1 | 0 | 0 |
| 01 | | WEIGHT | 8 | 4 | +W | 0 | # | 0 | +W | 0 | 0 | 0 |
| 02 | | PRICE | 8 | 4 | +C | +C | # | 0 | +C | +C | 0 | 0 |
| 03 | MEMORIES 2 | NO. OF ITEMS | 6 | 3 | +1 | +1 | # | 0 | +1 | +1 | 0 | 0 |
| 04 | | WEIGHT | 8 | 4 | +W | 0 | # | 0 | +W | 0 | 0 | 0 |
| 05 | | PRICE | 8 | 4 | +C | +C | # | 0 | +C | +C | 0 | 0 |
| 06 | MEMORIES 3 | NO. OF ITEMS | 6 | 3 | +1 | +1 | # | 0 | +1 | +1 | 0 | 0 |
| 07 | | WEIGHT | 8 | 4 | +W | 0 | # | 0 | +W | 0 | 0 | 0 |
| 08 | | PRICE | 8 | 4 | +C | +C | # | 0 | +C | +C | 0 | 0 |
| 09 | SUM MEMORIES / MEMORIES 1 | NO. OF ITEMS | 6 | 3 | +1 | +1 | # | 0 | +1 | +1 | 0 | 0 |
| 10 | | WEIGHT | 8 | 4 | +W | 0 | # | 0 | +W | 0 | 0 | 0 |
| 11 | | PRICE | 8 | 4 | +C | +C | 0 | 0 | +C | +C | −X | 0 |
| 12 | | NO. OF CUSTOMERS | 6 | 3 | 0 | 0 | # | +1 | 0 | +1 | 0 | 0 |
| 13 | MEMORIES 2 | NO. OF ITEMS | 6 | 3 | +1 | +1 | # | 0 | +1 | +1 | 0 | 0 |
| 14 | | WEIGHT | 8 | 4 | +W | 0 | # | 0 | +W | 0 | 0 | 0 |
| 15 | | PRICE | 8 | 4 | +C | +C | 0 | 0 | +C | 0 | −X | 0 |
| 16 | | NO. OF CUSTOMERS | 6 | 3 | 0 | 0 | # | +1 | 0 | 0 | 0 | 0 |
| 17 | MEMORIES 3 | NO. OF ITEMS | 6 | 3 | +1 | +1 | # | 0 | +1 | +1 | 0 | 0 |
| 18 | | WEIGHT | 8 | 4 | +W | 0 | # | 0 | +W | 0 | 0 | 0 |
| 19 | | PRICE | 8 | 4 | +C | +C | 0 | 0 | +C | +C | −X | 0 |
| 20 | | NO. OF CUSTOMERS | 6 | 3 | 0 | 0 | 0 | +1 | 0 | 0 | 0 | 0 |

FIG. 4B

| AD | MEMORIES | JOBS | DIGITS | BYTES | 0 WEIGHING LABEL | 1 FIXED-AMOUNT LABEL | 2 PRECEDING DATA CORRECTION | 3 TOTAL CUSTOMERS | 4 CLERK-CLASSIFIED ADD'NL WEIGHING REGISTR. | 5 CLERK-CLASSIFIED ADD'NL FIXED AMT. REGISTR. | 6 SUBTOTAL DISCOUNT | 7 RETROACTIVE CORRECTION PRECEDING DATA CORRECTION |
|----|----|----|----|----|----|----|----|----|----|----|----|----|
| 21 | TIME-ZONE CLASSIFIED MEMORIES | NO. OF ITEMS | 6 | 3 | +1 | +1 | # | 0 | +1 | +1 | 0 | 0 |
| 22 | | WEIGHT | 8 | 4 | +W | 0 | # | 0 | +W | 0 | 0 | 0 |
| 23 | | PRICE | 8 | 4 | +C | +C | # | 0 | +C | +C | −X | 0 |
| 24 | | NO. OF CUSTOMERS | 6 | 3 | 0 | 0 | 0 | +1 | 0 | 0 | 0 | 0 |
| 25 | CLERK-CLASSIFIED MEMORIES | NO. OF ITEMS | 6 | 3 | +1 | +1 | # | 0 | +1 | +1 | 0 | 0 |
| 26 | | WEIGHT | 8 | 4 | +W | 0 | # | 0 | +W | 0 | 0 | 0 |
| 27 | | PRICE | 8 | 4 | +C | +C | # | 0 | +C | +C | −X | 0 |
| 28 | | NO. OF CUSTOMERS | 6 | 3 | 0 | 0 | 0 | +1 | 0 | 0 | 0 | 0 |
| 29 | CLERK-CLASSIFIED SALES SUM MEMORIES | NO. OF ITEMS | 2 | 1 | 0 | 0 | 0 | @ | +1 | +1 | 0 | 0 |
| 30 | | WEIGHT | 6 | 3 | 0 | 0 | 0 | 0 | 0 | 0 | 0 | 0 |
| 31 | | PRICE | 6 | 3 | 0 | 0 | 0 | @ | +C | +C | −X | 0 |
| 32 | SUBTOTAL DISCOUNT MEMS. | NO. OF ITEMS | 6 | 3 | 0 | 0 | 0 | 0 | 0 | 0 | +1 | 0 |
| 33 | | PRICE | 8 | 4 | 0 | 0 | 0 | 0 | 0 | 0 | +X | 0 |
| 34 | CORRECTION MEMORIES | NO. OF ITEMS | 6 | 3 | 0 | 0 | +1 | 0 | 0 | 0 | 0 | +1 |
| 35 | | WEIGHT | 8 | 4 | 0 | 0 | 0 | 0 | 0 | 0 | 0 | +C |
| 36 | | PRICE | 8 | 4 | 0 | 0 | +C | +1 | 0 | 0 | 0 | +C |
| 37 | RECEIPT NO. MEMORY | | 4 | 2 | +1 | 0 | 0 | +1 | 0 | 0 | 0 | 0 |
| 38 | NO. OF ISSUED RECEIPTS | | 4 | 2 | −1 | +1 | # | 0 | 0 | 0 | 0 | 0 |
| 39 | REDUCTION (ONLY WHEN NO. PRESET) | | | | | −1 | # | 0 | 0 | 0 | 0 | 0 |
| 40 | TOTAL OF ISSUED LABELS | | 8 | 4 | +1 | +1 | 0 | +1 | +1 | +1 | 0 | 0 |

FIG.5A

| AD | MEMORIES | | JOBS | AD DIGITS | AD BYTES | 0 WEIGHING LABEL | 1 FIXED-AMOUNT LABEL | 2 PRECEDING DATA CORRECTION | 3 TOTAL CUSTOMERS | 4 CLERK-CLASSIFIED ADD'NL WEIGHING REGISTR. | 5 CLERK-CLASSIFIED ADD'NL FIXED AMT. REGISTR. | 6 SUBTOTAL DISCOUNT | 7 RETROACTIVE CORRECTION PRECEDING DATA CORRECTION |
|---|---|---|---|---|---|---|---|---|---|---|---|---|---|
| 00 | PLU MEMORIES | MEMORIES 1 | NO. OF ITEMS | 6 | 3 | +1 | +1 | # | 0 | +1 | +1 | 0 | 0 |
| 01 | | | WEIGHT | 8 | 4 | +W | 0 | # | 0 | +W | 0 | 0 | 0 |
| 02 | | | PRICE | 8 | 4 | +A | +A | # | 0 | +A | +A | 0 | 0 |
| 03 | | MEMORIES 2 | NO. OF ITEMS | 6 | 3 | +1 | +1 | # | 0 | +1 | +1 | 0 | 0 |
| 04 | | | WEIGHT | 8 | 4 | +W | 0 | # | 0 | +W | 0 | 0 | 0 |
| 05 | | | PRICE | 8 | 4 | +C | +C | # | 0 | +C | +C | 0 | 0 |
| 06 | | MEMORIES 3 | NO. OF ITEMS | 6 | 3 | +1 | +1 | # | 0 | +1 | +1 | 0 | 0 |
| 07 | | | WEIGHT | 8 | 4 | +W | 0 | # | 0 | +W | 0 | 0 | 0 |
| 08 | | | PRICE | 8 | 4 | +A-C | +A-C | # | 0 | +A-C | +A-C | 0 | 0 |
| 09 | SUM MEMORIES | MEMORIES 1 | NO. OF ITEMS | 6 | 3 | +1 | +1 | # | 0 | +1 | +1 | 0 | 0 |
| 10 | | | WEIGHT | 8 | 4 | +W | 0 | # | 0 | +W | 0 | 0 | 0 |
| 11 | | | PRICE | 8 | 4 | +A | +A | # | 0 | +A | +A | -X | 0 |
| 12 | | | NO. OF CUSTOMERS | 6 | 3 | 0 | 0 | 0 | +1 | 0 | 0 | 0 | 0 |
| 13 | | MEMORIES 2 | NO. OF ITEMS | 6 | 3 | +1 | +1 | # | 0 | +1 | +1 | 0 | 0 |
| 14 | | | WEIGHT | 8 | 4 | +W | 0 | # | 0 | +W | 0 | 0 | 0 |
| 15 | | | PRICE | 8 | 4 | +C | +C | # | 0 | +C | +C | -X | 0 |
| 16 | | | NO. OF CUSTOMERS | 6 | 3 | 0 | 0 | 0 | +1 | 0 | 0 | 0 | 0 |
| 17 | | MEMORIES 3 | NO. OF ITEMS | 6 | 3 | +1 | +1 | # | 0 | +1 | +1 | 0 | 0 |
| 18 | | | WEIGHT | 8 | 4 | +W | 0 | # | 0 | +W | 0 | 0 | 0 |
| 19 | | | PRICE | 8 | 4 | +A-C | +A-C | # | 0 | +A-C | +A-C | -X | 0 |
| 20 | | | NO. OF CUSTOMERS | 6 | 3 | 0 | 0 | 0 | +1 | 0 | 0 | 0 | 0 |

FIG. 5B

| AD | MEMORIES | JOBS | DIGITS | BYTES | 0 WEIGHING LABEL | 1 FIXED-AMOUNT LABEL | 2 PRECED-ING DATA CORREC-TION | 3 TOTAL CUST-OMERS | 4 CLERK-CLASSIFIED ADD'NL WEIGHING REGISTR. | 5 CLERK-CLASSIFIED ADD'NL FIXED AMT. REGISTR. | 6 SUBTOTAL DISCOUNT | 7 RETRO-ACTIVE CORREC-TION PRE-CEDING DATA CORRECTION |
|---|---|---|---|---|---|---|---|---|---|---|---|---|
| 21 | TIME-ZONE CLASSIFIED MEMORIES | NO. OF ITEMS | 6 | 3 | +1 | +1 | # | 0 | +1 | +1 | 0 | 0 |
| 22 | | WEIGHT | 8 | 4 | +W | 0 | # | 0 | +W | 0 | 0 | 0 |
| 23 | | PRICE | 8 | 4 | +C | +C | # | 0 | +C | +C | −X | 0 |
| 24 | | NO. OF CUSTOMERS | 6 | 3 | 0 | 0 | 0 | +1 | 0 | 0 | 0 | 0 |
| 25 | CLERK-CLASSIFIED MEMORIES | NO. OF ITEMS | 6 | 3 | +1 | +1 | # | 0 | +1 | +1 | 0 | 0 |
| 26 | | WEIGHT | 8 | 4 | +W | 0 | # | 0 | +W | 0 | 0 | 0 |
| 27 | | PRICE | 8 | 4 | +C | +C | # | 0 | +C | +C | −X | 0 |
| 28 | | NO. OF CUSTOMERS | 6 | 3 | 0 | 0 | 0 | +1 | 0 | 0 | 0 | 0 |
| 29 | CLERK-CLASSIFIED SALES SUM MEMORIES | NO. OF ITEMS | 2 | 1 | 0 | 0 | 0 | ⊕ | +1 | +1 | 0 | 0 |
| 30 | | WEIGHT | 6 | 3 | 0 | 0 | 0 | 0 | 0 | 0 | 0 | 0 |
| 31 | | PRICE | 6 | 3 | 0 | 0 | 0 | ⊕ | +C | +C | 0 | 0 |
| 32 | SUBTOTAL DIS-COUNT MEMS. | NO. OF ITEMS | 6 | 3 | 0 | 0 | 0 | 0 | 0 | 0 | +1 | 0 |
| 33 | | PRICE | 8 | 4 | 0 | 0 | 0 | 0 | 0 | 0 | +X | 0 |
| 34 | CORRECTION MEMORIES | NO. OF ITEMS | 6 | 3 | 0 | 0 | +1 | 0 | 0 | 0 | 0 | +1 |
| 35 | | WEIGHT | 8 | 4 | 0 | 0 | 0 | 0 | 0 | 0 | 0 | +C |
| 36 | | PRICE | 8 | 4 | 0 | 0 | +C | 0 | 0 | 0 | 0 | +C |
| 37 | RECEIPT NO. MEMORY | | 4 | 2 | 0 | +1 | 0 | +1 | 0 | 0 | 0 | 0 |
| 38 | NO. OF ISSUED RECEIPTS | | 4 | 2 | +1 | −1 | # | 0 | 0 | 0 | 0 | 0 |
| 39 | REDUCTION (ONLY WHEN NO. PRESET) | | | | −1 | −1 | # | 0 | 0 | 0 | 0 | 0 |
| 40 | TOTAL OF ISSUED LABELS | | 8 | 4 | +1 | +1 | 0 | +1 | +1 | +1 | 0 | 0 |

APPARATUS FOR PROCESSING CONTENTS OF TOTALIZING MEMORIES IN ELECTRONIC BALANCE ASSEMBLY

This application is a continuation of application Ser. No. 943,730, filed Dec. 19, 1986, now abandoned.

FIELD OF THE INVENTION AND RELATED ART STATEMENT

The present invention relates to an electronic balance assembly equipped with totalizing memories and, more particularly, to a memory processing apparatus for changing and setting data contents stored in totalizing memories.

There has been known an electronic balance assembly of the type that calculates the relationship between a weight and a price or the like, then feeds the result of such calculation into totalizing memories to execute summing, and computes a daily or weekly sales account. Such totalizing process is executed according to some predetermined arithmetic expressions in a given program. Therefore, the contents to be totalized are changeable by altering the program.

Meanwhile, since the contents to be totalized are programmed, alteration of the entire program is necessary even for mere partial change of the contents. Consequently, specific technical knowledge peculiar to each program is required for changing the contents to be totalized, and the operation for such change is extremely difficult for general users. It is therefore impossible to promptly meet the demand for changing such contents at the user level.

OBJECT AND SUMMARY OF THE INVENTION

It is an object of the present invention to provide an improved apparatus for processing the contents of totalizing memories in an electronic balance assembly with a capability of easily changing the contents to be totalized.

In order to accomplish the object mentioned above, the present invention comprises an item sign memory for storing, in the form of signs, items to be processed such as weight, PLU price (stock control number or inventory number) and so forth, an arithmetic sign memory for storing arithmetic signs such as +, − and so forth; a plurality of totalizing memories with designated addresses; an internal memory having a matrix-like memory processing table where processing numerical expressions are set by combinations of item signs with arithmetic signs at prescribed addresses between the totalizing memories and the memory processing timing for issuance of label, registration and so forth with respect to such totalizing memories, and an external input means for designating a desired address in the internal memory and changing and inputting the processing numerical expression.

The content of each totalizing memory is specified by the processing numerical expression obtained by combining item signs with arithmetic signs in the memory processing table of the internal memory. Accordingly, it becomes possible to simply set a new processing numerical expression in the memory processing table by changing the alterable item signs and arithmetic signs by the external input means, whereby change and setting of the contents to be totalized are rendered achievable at the user level with facility.

DESCRIPTION OF THE PREFERRED EMBODIMENT

Figure 1:
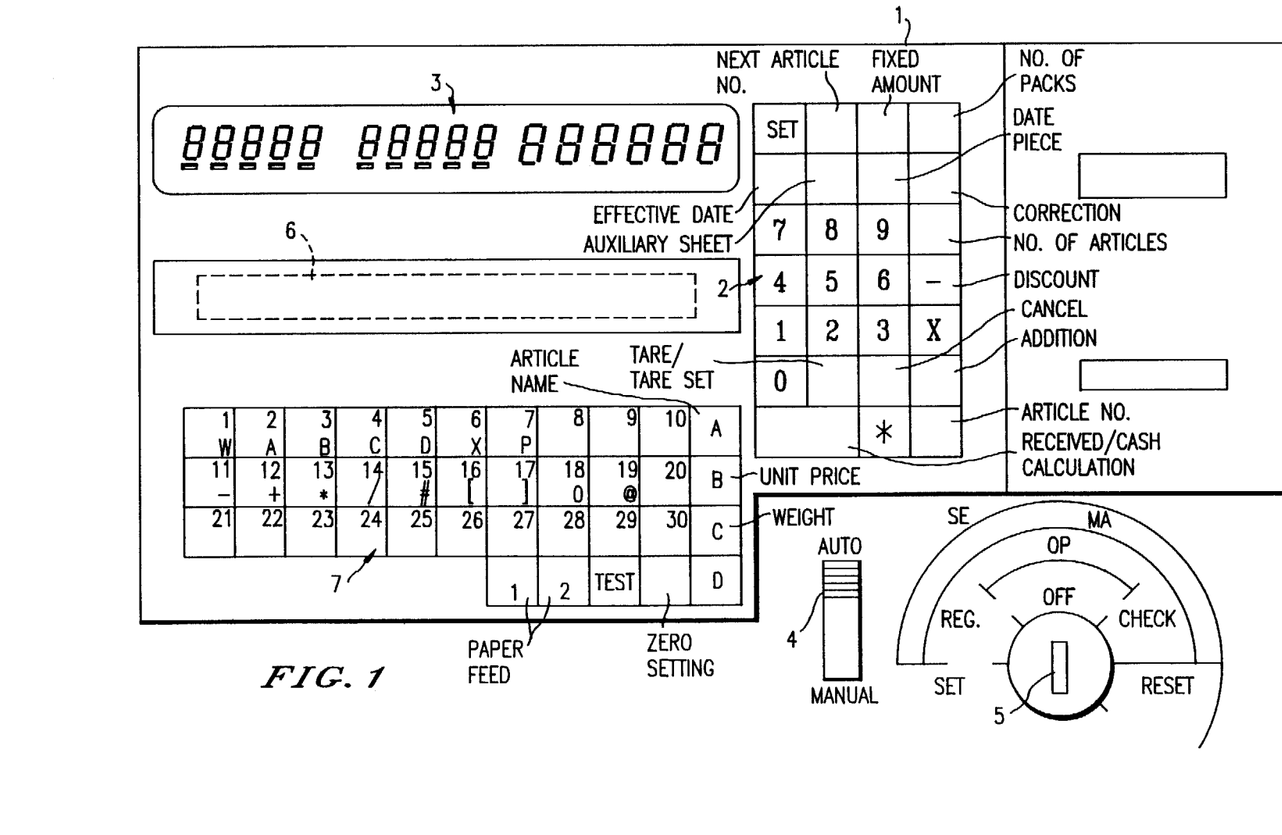
FIG. 1 is a front view of a control panel in an exemplary embodiment of the present invention.

Hereinafter an exemplary embodiment of the present invention will be described with reference to FIGS. 4 and 5 and FIGS. 1 through 3. FIG. 1 illustrates a control panel in an electronic balance assembly whose entire structure is not shown. The control panel 1 is equipped with a keyboard 2, a display 3, an automatic/-manual selector switch 4, a key switch 5, a platen area 6 and a keyboard 7 serving as an external input means for a plurality of totalizing memories. The keyboard 2 comprises, for example, ten numeral keys and those for setting, next article number and mode, fixed amount and so forth. The key switch 5 is used for selecting one of "SET", "REGISTER", "CHECK" and "RESET" modes. And in the keyboard 7 for the totalizing memories, a key No. 1 corresponds to "W", a key No. 2 to "A", ..., and a key No. 19 to "@", respectively.

Figure 2:
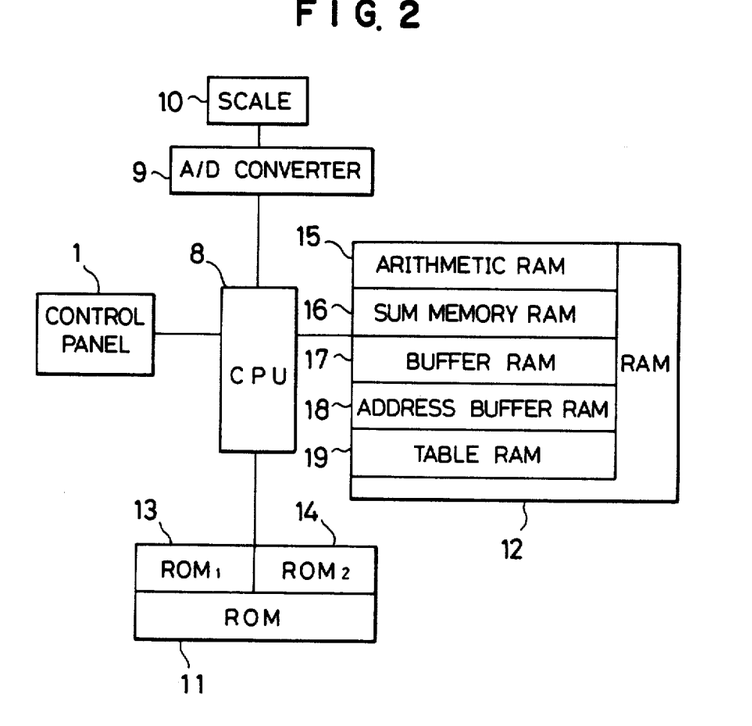
FIG. 2 is a block diagram of the embodiment.
Figure 3A:
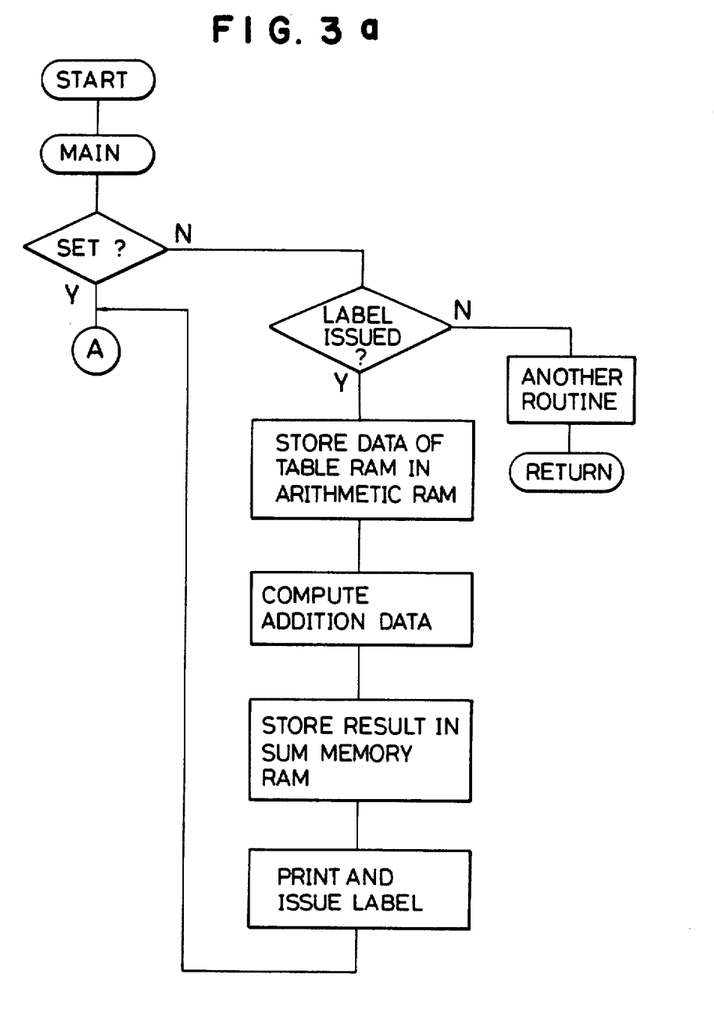
FIG. 3a and FIG. 3b are a flow chart showing the procedure of changing and setting data contents to be totalized.
Figure 3B:
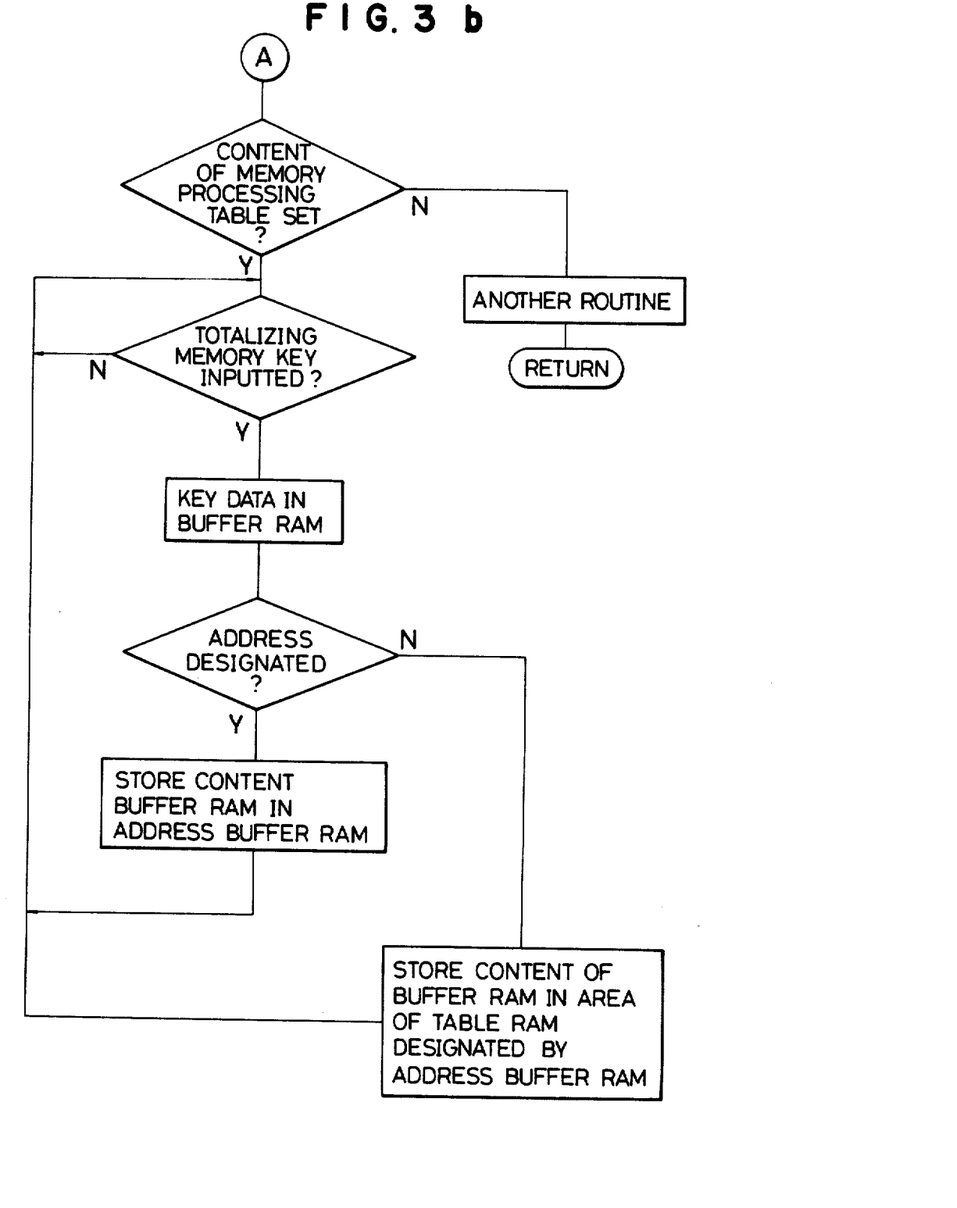
Figure 4A:
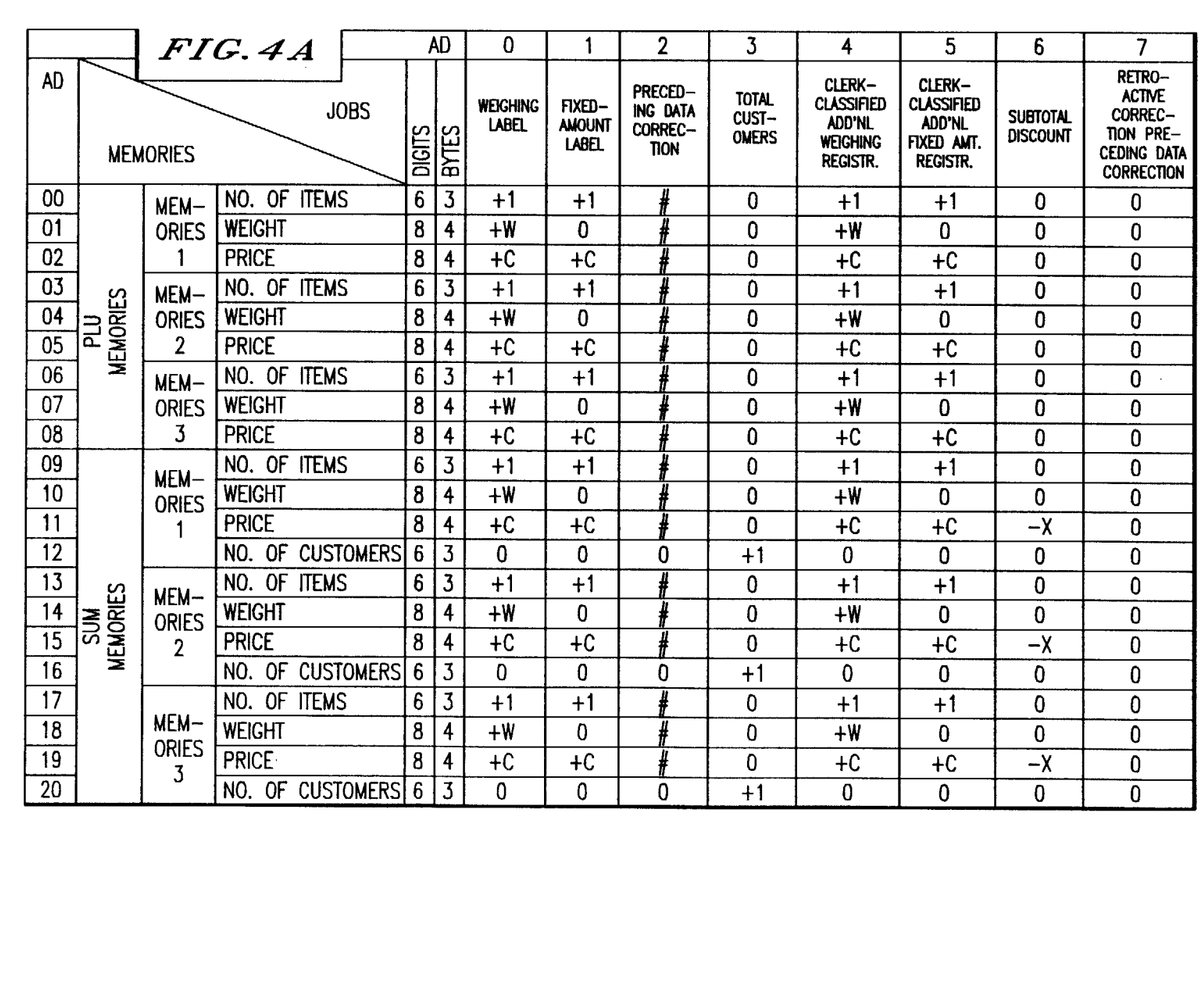
FIG. 4, consisting of FIGS. 4A–4B, and FIG. 5, consisting of FIGS. 5A–5B, are respectively Tables 1 and 2 which relate to the operation of this invention.
Figure 4B:
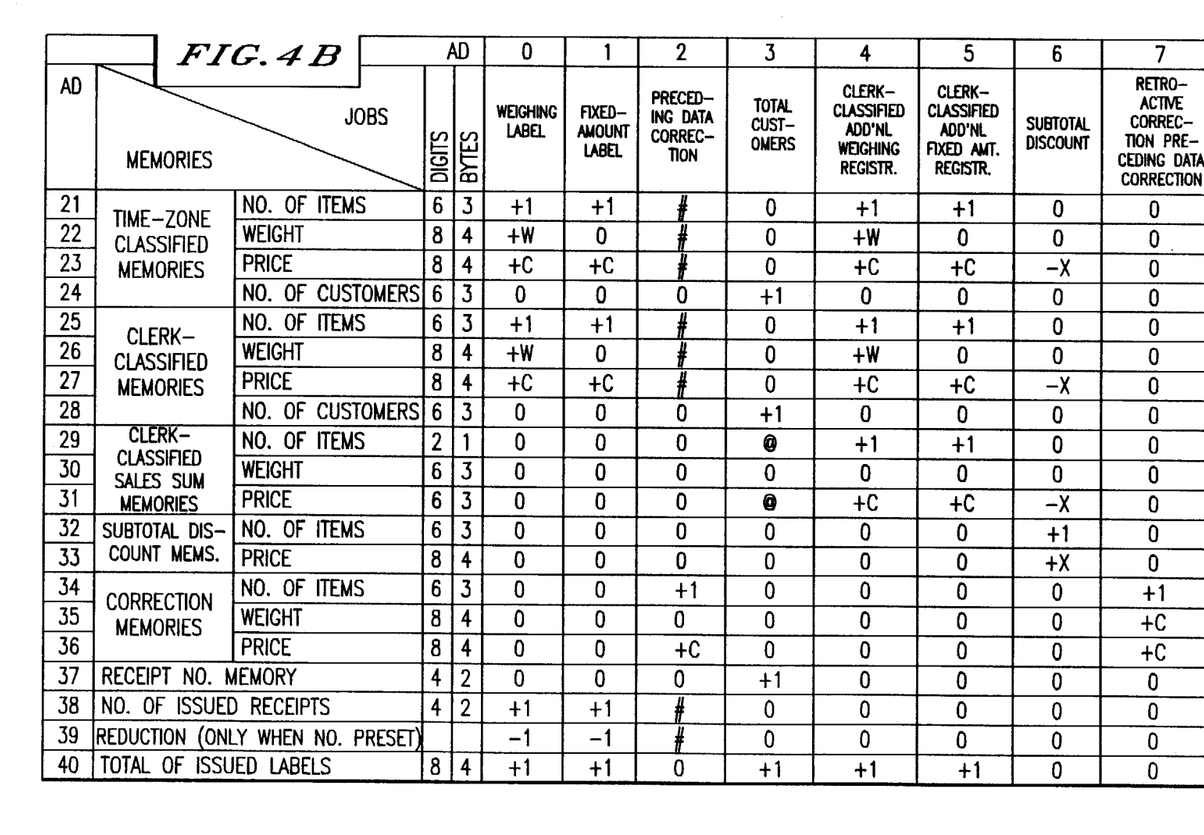

The electrical connection of the individual units is schematically shown in the block diagram of FIG. 2. There is provided a CPU 8, to which a scale 10 is connected via an analog-to-digital converter 9. And the components on the control panel 1, such as the sum memory keyboard 7 and so forth are also connected to the CPU 8, while a ROM 11 and a RAM 12 are connected thereto as well. The ROM 11 includes a section $ROM_1$ 13 which serves as an item sign memory and a $ROM_2$ 14 as an arithmetic sign memory. The $ROM_1$ 13 stores, in the form of signs, items such as weight, PLU price and so forth to be processed; while the $ROM_2$ 14 stores arithmetic signs such as +, − and so forth. More specifically, the following item signs are set.

W: weight
A: PLU price
B: temporarily changed price
C: post-discount price (including temporary change) (equal to A in case of no discount or temporary change)
X: subtotal discount
P: number of articles
D: first cost As for the arithmetic signs, the following are set.
−: subtraction
+: addition
×: multiplication
/: division
: memory reverse operation at registration (preceding-data correction)
[ ]: absolute value
0: no process
@: memory clear Meanwhile, the aforesaid RAM 12 includes an arithmetic RAM 15, a sum memory RAM 16, a buffer RAM 17, an address buffer RAM 18 and a table RAM 19 serving as an internal memory. The buffer RAM 17 temporarily stores a processing numerical expression formed by a combination of item signs with arithmetic signs, and address data for inputting such numerical expression. The address data thus stored in the buffer RAM 17 is further stored temporarily in the address buffer RAM 18. The table RAM 19 stores a processing numerical expression at each designated address and thereby forms a memory processing table as shown in FIG. 4. That is, according to the table RAM 19, a matrix-like memory processing table is formed by storing numerical expressions at predetermined addresses in a plurality of unshown totalizing memories addressed per memory processing timing. The arithmetic RAM 15 temporarily stores the content of the table RAM 19 for calculating the arithmetic expressions of the memory processing table. And the sum memory RAM 16 stores the result of calculation of the data stored temporarily in the arithmetic RAM 15.

Now the detail of the table RAM 19 will be described below with reference to FIG. 4. FIG. 4 shows a processing table of the totalizing memories in the table RAM 19. As shown in the columns of FIG. 4, the totalizing memories include three PLU memories 1-3 and three sum memories 1-3. The PLU memories have address numbers (hereinafter referred to simply as AD) 00-08, where processing numerical expressions relative to the data of typical articles are inputted. The numerical expressions are represented by combinations of the item signs such as weight, PLU price and so forth stored in the $ROM_1$ 13 and the arithmetic signs such as +, − and so forth stored in the $ROM_2$ 14. The sum memories have AD 09-20 where processing numerical expressions relative to the sum of the data are inputted. Besides the above, the totalizing memories further include time zone-classified memories, clerk-classified memories, clerk-classified sales sum memories, subtotal discount memories, correction memories, a receipt number memory, an issued number memory, a reduction memory, and an issued-labels total memory. The time zone-classified memories have AD 21-24 to store processing numerical expressions relative to data of a predetermined number of divided daily time zones; the clerk-classified memories have AD 25-28 to store processing numerical expressions relative to data classified by clerks; the clerk-classified sales sum memories have AD 29-31 to store processing numerical expressions relative to data of individual customers; and the subtotal discount memories have AD 32 and 33 to store processing numerical expressions relative to data of discount of articles. The receipt number memory having AD 37 is used merely for receipts; while the issued number memory, reduction memory and issued-labels total memory having Ad 38-40 are used merely for labels.

The rows in FIG. 4 represent the memory processing timing that includes "weighing label", "fixed-amount label", "preceding-data correction", "total customers", "clerk-classified additional weighing registration", "clerk-classified additional fixed amount registration", "subtotal discount" and "retroactive correction, preceding-data correction". These are representative of the timing to process the contents of the totalizing memories mentioned above. More specifically, at "weighing label" of Ad 0 is inputted a processing numerical expression relative to the data of an article which needs to be weighed by the balance 10; and at "fixed-amount label" of AD 1 is inputted a processing numerical expression relative to the data of an article which need not be weighed. At "total customers" of AD 3 is inputted a processing numerical expression relative to the data of the number of customers corresponding to the number of issued receipts; at "clerk-classified additional weighing registration" of AD 4 is inputted a processing numerical expression relative to the data of a clerk-classified article which needs to be weighed; at "clerk-classified additional fixed amount registration" of AD 5 is inputted a processing numerical expression relative to the data of a clerk-classified article which need not be weighed; at "subtotal discount" of AD 6 is inputted a processing numerical expression relative to the data of discount per subtotal; and at "retroactive correction, preceding-data correction" of AD 2 and 7 are inputted processing numerical expressions relative to the data for correction of the previous data. The "preceding-data correction" is used for correcting the data already inputted into the sum memory RAM 17, while the "retroactive correction" is used for correcting the data in the stage anterior thereto.

The totalizing memories and the processing timing are arrayed in the form of a matrix, and the processing numerical expressions are set at the intersections of the columns and rows of such matrix, whereby a memory processing table is prepared. FIG. 4 shows an example of such memory processing table, wherein three PLU memories and three sum memories 1-3 are employed to serve respectively as a daily memory, a total memory 1 and a total memory 2. A final sold amount C is added (numerical expression +C) to the price term in each of the memories 1-3 and, after such addition, the reset timing of the memories 1-3 are determined as follows:

Memory 1 . . . daily end

Memory 2 . . . weekly end

Memory 3 . . . monthly end

Thus, the memories 1, 2 and 3 are used to represent a daily sales account, a weekly sales account and a monthly sales account, respectively.

Figure 5A:
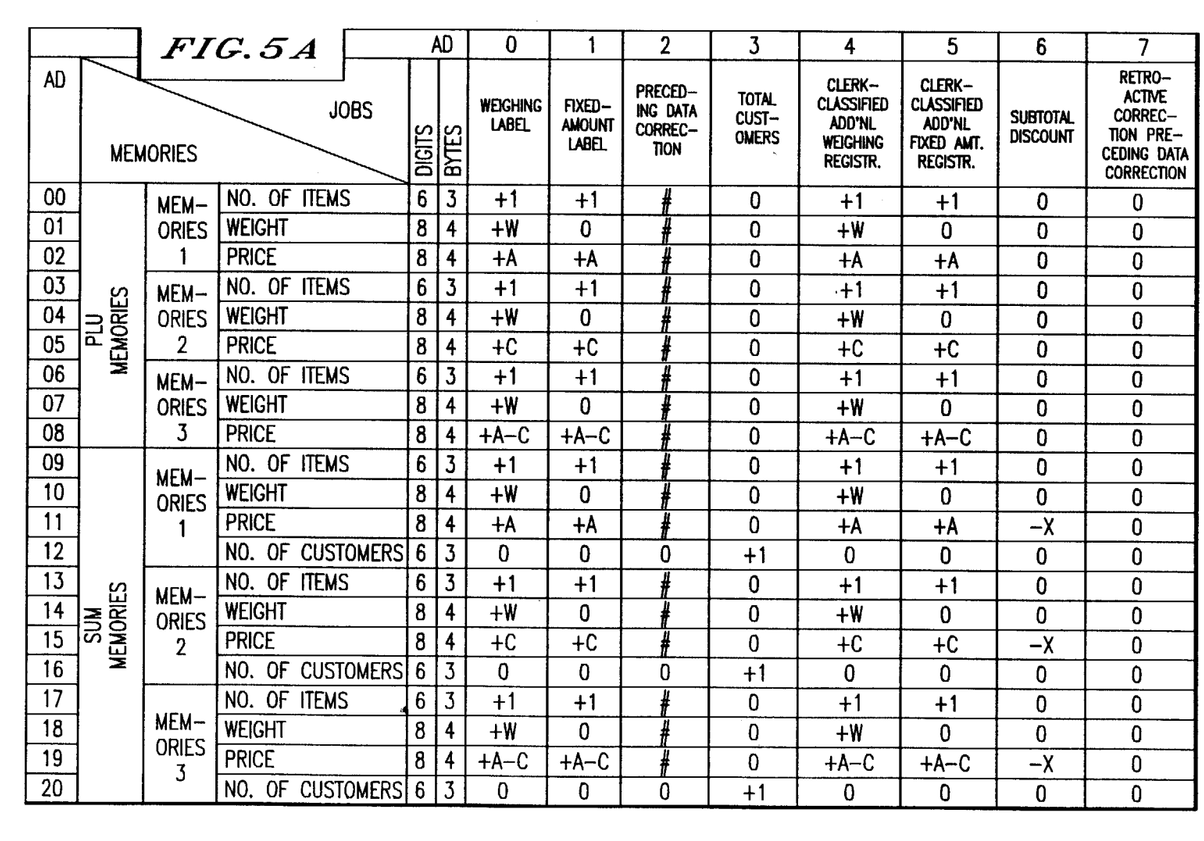
Figure 5B:
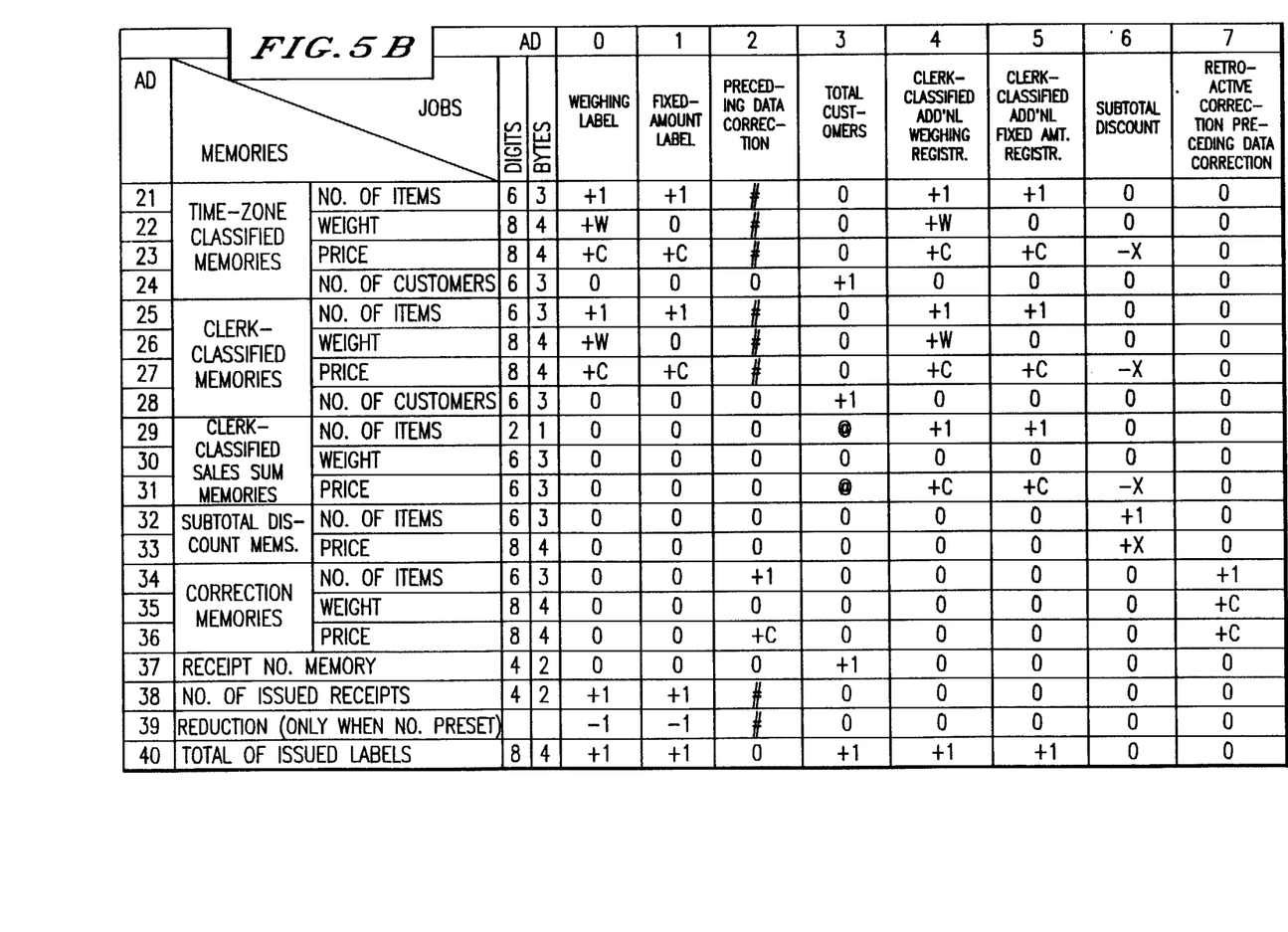

In this arrangement, after the change of the contents of the memory processing table is performed, the memory processing table appears as is shown in FIG. 5. The procedure of changing the contents of such table is shown in a flow chart of FIG. 3a and FIG. 3b. First the kind of the operation to be performed is determined by actuating the key switch 5. That is, actuation of the switch 5 selects setting, issuance of a label or some other processing mode. Subsequently, in the case of any setting mode, the kind of the content to be set is determined. For example, when the content of the memory processing table is to be changed and set, the key "1" on the keyboard 2 is depressed to detect whether any key on the totalizing memory keyboard 7 has been depressed or not. An in case any key depression is detected, the corresponding key data is inputted into the buffer RAM 17. Then, either designation of the address or change of the processing numerical expression is selected by means of a flag. Selection of the flag is executed by depressing the key "*" each time. That is, when this key is depressed, the flag becomes "1" or "0" repeatedly to provide an address designation chance or a numerical expression setting change alternately. In the case of designating the address, the key data stored in the buffer RAM 17 is transferred to the address buffer RAM 18. Meanwhile in the case of changing the processing numerical expression, the data stored in the buffer RAM 17 is transferred to the table RAM 19 and is stored therein. The area for data storage is the designated address transferred to the address buffer RAM 18 and stored therein. Accordingly, the address designation is a prerequisite for changing the processing numerical expression. In the next step, there is detected whether any key on the totalizing memory keyboard 7 has been depressed or not, thereby providing a chance to change the numerical expression in the table RAM 19. In this manner the contents of the table are changed and set, so that an altered memory processing table is formed in the table RAM 19.

In exemplary manipulation of the totalizing memory keyboard 7 for address designation, 002 is key-inputted and the execution key "*" is depressed. Out of 002, the first 0 denotes AD of the processing timing, and the next 02 denotes AD of the totalizing memory. In the case of changing the processing numerical expression, a desired numerical expression can be formed by a combination of item signs and arithmetic signs. When the change is from FIG. 4 to FIG. 5 where "+C" in the designated address 002 is replaced with "+A", the keys "+" and "A" are depressed first and then the execution key "*" to set the desired numerical expression. In any of the designated addresses 008, 108, 408, 508, 019, 119, 419 and 519, similarly the keys "+", "A", "−", "C" are depressed and then the execution key "*". As a result of changing the contents of the memory processing table, the three PLU memories 1-3 and the three sum memories 1-3 shown in FIG. 4 are altered respectively to a list price memory, a sale price memory and a difference memory.

Subsequently the key switch 5 is actuated to select issuance of a label as the next operation mode. Then the content stored in the table RAM 19 is transferred to and stored in the arithmetic RAM 15, where the added data is computed and the result is stored in the sum memory RAM 16. That is, the processing numerical expression equal to the one stored in the table RAM 19 is computed and the result thereof is stored in the sum memory RAM 16. In this stage the predetermined items based on the stored data in the sum memory RAM 16 are printed on a label, which is then issued.

According to the present invention, as mentioned hereinabove, the contents of the totalizing memories can be changed with facility merely by a simple operation of key-inputting numerical expressions which are formed by combination of item signs with arithmetic signs through manipulation of the totalizing memory keyboard 7. Therefore, changing the contents of the totalizing memories is achievable simply by the user himself, hence accomplishing a prompt function to meet the user's demand.

The numerical expressions of the memory processing table after computation are stored in unshown areas of the RAM 12 classified by articles or clerks. For example, if there are six clerks A-F, the data concerning the individual clerks A-F are stored in the RAM 12 independently of one another. Although the totalizing memory keyboard 7 is employed as an external input means for item signs, arithmetic signs and so forth in the exemplary embodiment described, such signs may be inputted from the host side connected to the electronic balance assembly through in-line.

What is claimed is:

1. An apparatus for storing contents of totalizing memories in an electronic balance assembly, comprising:
   an item sign memory for storing, in the form of data related to the items to be weighed, such as the unit weight of an item, the price per unit weight, said item's unit price or the like;
   an arithmetic sign memory for storing arithmetic signs for each of said items to be weighed;
   a temporary numerical storage memory having a matrix-like memory processing table where processing numerical expressions are set by combination of said data stored in said item sign memory and said arithmetic sign memory, at predetermined locations within said totalizing memories, based upon designated storage addresses for executing programs controlling the issuance of a printed label, with respect to data in said totalizing memories; and
   an external input means for designating a desired address in said temporary numerical storage memory and changing and inputting said processing numerical expression thereto.

2. The apparatus as defined in claim 1, wherein said external input means comprises totalizing memory keys arrayed on a control panel.

3. The apparatus as defined in claim 2, further comprising:
   a buffer ram coupled to said memories;
   a table RAM also coupled to said memories;
   wherein the item sign data is arithmetic signs inputted by said totalizing memory keys and which is stored temporarily in said buffer RAM, and said data is then fed to said table RAM in response to the setting of a flag in response to inputs from said external input means.

* * * * *